United States Patent [19]

Ferguson

[11] Patent Number: 4,777,784

[45] Date of Patent: Oct. 18, 1988

[54] HORSE TETHERING DEVICE

[76] Inventor: Thomas B. Ferguson, 4605 Fulton Ave., Apt. 3, Sherman Oaks, Calif. 91423

[21] Appl. No.: 929,738

[22] Filed: Nov. 12, 1986

[51] Int. Cl.$^4$ .............................................. B68B 1/00
[52] U.S. Cl. ...................................... 54/34; 119/109; 57/225
[58] Field of Search ............... 119/106, 109, 111, 114; 54/34, 64, 24; 87/1, 2, 6; 57/216, 217, 220, 221–223, 225

[56] References Cited

U.S. PATENT DOCUMENTS

| | | | |
|---|---|---|---|
| 398,965 | 3/1889 | Hunt | 54/34 |
| 752,414 | 2/1904 | Price | 57/225 X |
| 927,275 | 7/1909 | Parker | 54/34 |

Primary Examiner—Robert P. Swiatek
Assistant Examiner—R. Thomas Price
Attorney, Agent, or Firm—Nemschoff & Supnik

[57] ABSTRACT

A horse tethering device cord has a central stretchable resilient core surrounded by a braided sheath and a loosely fitting protective plastic outer covering about the braided sheath. The core has a stretch length breaking point less than the stretch length breaking point of the sheath. The sheath and cord are attached to horse halter engaging clasps at one end and a bull snap at the other end. In use, a tethering device is used to keep a horse restrained to a hitching post. Movement by the horse from the hitching post causes stretching of the cord. If the horse exceeds the breakpoint of the central core, the core snaps, while the sheath remains intact.

18 Claims, 1 Drawing Sheet

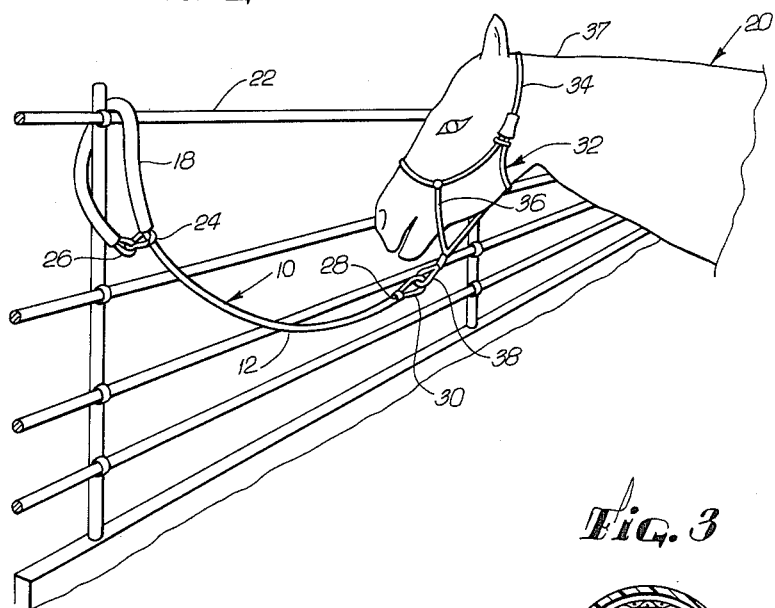
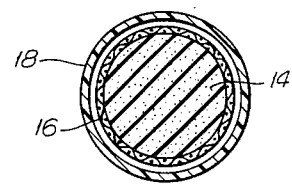
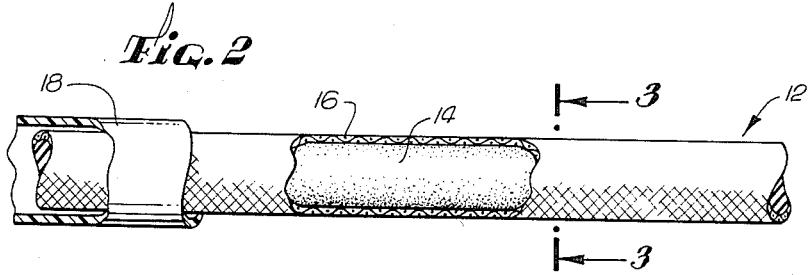
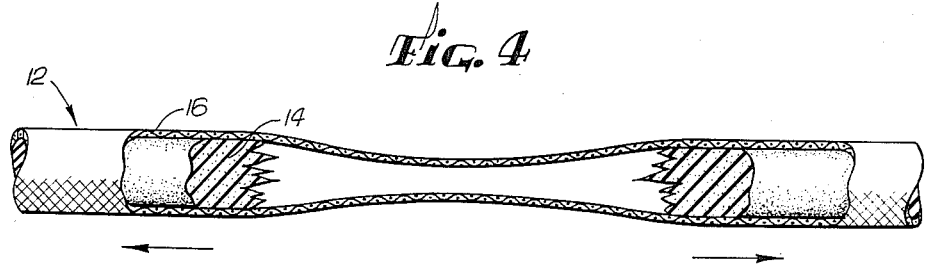

HORSE TETHERING DEVICE

FIELD OF THE INVENTION

This invention relates to devices for attaching horses to hitching posts. In particular, the invention pertains to horse tethering devices.

BACKGROUND OF THE INVENTION

Various types of tethering devices have been used in the past to prevent horses from straying far from a hitching post. Typically, one end of a rope is attached to a halter on the horse. The other end of the rope is simply tied to the hitching post. The rope may be fastened with a bull snap in a loop about the hitching post. Should the horse pull on the rope and exceed the rope's breaking point, the horse is likely to become erratic, jump about the neighboring environment and become injured.

SUMMARY OF INVENTION

A horse tethering device is provided which comprises a cord having a resilient inner core and a surrounding sheath. The sheath is stretchable as is the inner core, however the break point of the core is less than the break point of the sheath.

In a more specific example, the sheath and cord are attached to clasps which engage a halter on the horse, while the other end of the sheath and core are attached to a hitching post. The resulting effect is that should the horse pull on the tethering device, the core will break and snap first while the sheath will remain intact. Thus, the snapping is confined to the interior of the sheath, avoiding injury to the horse. Yet the sheath still remains attached to the hitching post providing that the breaking point of the sheath is not also exceeded.

BRIEF DESCRIPTION OF THE DRAWINGS

The nature of the invention described herein may be best understood and appreciated by the following description taken in connection with the accompanying drawings in which:

FIG. 1 is a perspective view of the invention in which a horse is tethered to a hitching post;

FIG. 2 is a segment of the cord used in the tethering device of FIG. 1 with portions removed and portions exposed;

FIG. 3 is a cross sectional view of a segment of the cord taken along lines 3—3 of FIG. 2; and FIG. 4 is a representational view of the segment depicted in FIG. 2 in which the cord has been stretched past the breaking point of the core.

DETAILED DESCRIPTION

With particular reference to FIGS. 1, 2, 3 and 4, a horse tethering device 10 in accordance with this invention generally comprises a cord 12 having a resilient longitudinal central cor 14 having a circular cross-section. Typically the core 14 is three-eighths inch rubber, generally known as rubber round stock. A sheath 16 is disposed over the core 14. Typically the sheath 16 comprises a woven or double braided fabric such as dacron. The woven or braided nature of the sheath allows it to be easily pushed over the core for manufacture, yet it provides for a limited amount of stretching before breaking. Other types of braided fabric 16 which may be used include spandex, nylon or other material which is loose enough to slide over the core 14 yet allows stretching without breaking prior to the breaking length of the core 14. The maximum stretching ratio of the core, that is, the ratio of length of the cord at the break point to the nominal length of the core, is greater than 2:1. A typical cord 12 has a nominal length of 4 feet, and has a core stretchable to a breakpoint of 12 feet. The breaking point of the core to be selected, for example, is 12 feet (3.6 m) for the inside core having a nominal unstretched length of 4 feet (1.2 m) while the outer sheath 16 has a nominal breaking point of in excess of 12 feet. Preferably, the ratio of the breaking length of the sheath 16 to the core 14 is greater than about six to five (6:5) so that even though the center core 14 has stretched beyond the snapping point and snapped, the outer braided sheath may be pulled somewhat further before breaking. To prevent fraying and splintering the outer sheath 16, a loosely fitting outer covering 18 of plastic, as depicted in FIGS. 2 and 3 may be applied over a portion of the sheath 16 to enhance the useful life of the sheath 16. The covering 18 is typically 1 ½ feet in length (0.5 meter). The covering is most appropriate when the sheath 16 comprises materials such as dacron.

With particular reference to FIG. 1, a horse 20 is shown attached to a hitching post 22 by the horse tethering device 10. A bull snap or metal clasp 24 affixed to one end 26 of the horse tethering device 10 may be opened to removably grasp the sheath 16 adjacent the one end 26, looping the sheath 16 about the hitching post or fence 22.

At the opposite end 28 of the device 10, a second clasp 30 for attachment to a halter 32 is affixed to the end 28 of the device 10. The clasp 30 is fixed to gras and hold the core 14 as well as the outer sheath 16, to maintain sufficient breakage tension on the core 14. Similarly the clasp 24 grasps and holds the core 14 as well as the outer sheath 16.

A halter 3 is attached to the horse 20. The halter 32 comprises a neck strap 34 for attaching the halter 32 to the horse's neck 37 and a chin strap 36 affixed to the neck strap 34 for affixing the tethering device to the neck strap 34 away from the neck 37 of the horse 20. The chin strap has a loop 38 or other clasp for receiving the clasp 30 of the tethering device.

In use, the clasp 30 of the tethering device is attached to the chin strap 38 of the halter 32, which is worn by the horse 20. The clasp 24 of the tethering device is looped about a hitching post 22 or fence and the clasp 24 is looped about an end of the sheath 16. If a covering 18 is on the sheath, the covering is moved toward the end 26 of the tethering device 10, away from the horse, so that it is the covering 18 that is directly looped about the hitching post 22 or fence.

If the horse should stray from the hitching post, the sheath will first pull the loop through the clasp 24. Further pulling by the horse will result in the device 10 stretching. As the sheath 16 is stretched, so is the inner core 14. Should the horse pull beyond the breaking point of the inner core 14, the inner core 14 will break, as shown diagrammatically in FIG. 4. However, since the sheath 16 has not yet reached its breaking point, the sheath 16 will still be ready to prevent some degree of further pulling by the horse.

The remaining strength of the sheath 16 is sufficient to prevent the horse 20 from moving from the hitching post 22 to some degree. If the horse 20 pulls further from the hitching post 22, snapping the sheath 16, the danger is not as great as would otherwise occur from the uncontrolled snapping of the inner core 14.

While the invention has been described with reference to specific forms thereof, it will be understood that changes and modifications maybe made within the spirit and scope of this invention.

What is claimed is:

1. A horse tethering device comprising:
   longitudinal cord means for attaching a horse to a hitching post having
      longitudinal inner core means for providing an inner resilient and breakable tension to the cord means, the core means defining a first breaking length; and
      longitudinal outer sheath means disposed over the core means, the sheath means for maintaining a horse attached to the hitching post even in the event of breakage of the longitudinal inner core means, the sheath means having a breaking length greater than the first breaking length of the inner core means, whereby a force exerted on the tethering device results in the snapping of the inner core means prior to any breakage of the outer sheath; and
   means for attaching the longitudinal cord means to a horse halter, remote from a hitching post.

2. The invention as set forth in claim 1 and in which the core means comprises rubber round stock.

3. The invention as set forth in claim 1 and in which the sheath means comprises braided woven material fitted over the core means.

4. The invention as set forth in claim 3 and in which the sheath means further comprises a plastic covering disposed over the braided woven material to prevent fraying of the woven material when disposed about a hitching post.

5. The invention as set forth in claim 1 and in which the attaching means comprising a halter coupled to the cord means.

6. The invention as set forth in claim 5 and in which the ratio of the breaking length of the sheath means to the core means is greater than the ratio of 6 to 5.

7. The invention as set forth in claim 5 and in which the breaking length of the core means is greater than three times the nominal length of the core means, and the breaking length of the sheath means is greater than the breaking length of the core means.

8. The invention as set forth in claim 5 and comprising covering means for protecting the sheath means when looped about a hitching post, the covering means comprising a loosely fitting portion surrounding a segment of the sheath means.

9. The invention as set forth in claim 1 and comprising a bull snap coupled to the tethering device remote from the horse halter means.

10. A horse tethering device comprising:
    halter means for attaching a cord to a horse, the halter means having means for receiving a clasp;
    rope means for coupling the halter means to a hitching post, the rope comprising
       an outer sheath; and
       a resilient inner core, the inner resilient core having a breaking length and the outer sheath defining a breaking length greater than the breaking length of the inner core so that excess movement of a horse when attached to the halter means and the rope means affixed to the hitching post results in the inner core breaking before the sheath, whereby the breaking and snapping of the inner core occurs within the sheath avoiding injury to the horse from the snapping of the core.

11. The invention as set forth in claim 10 and in which the core comprises rubber round stock and in which the sheath comprises braided woven material fitted over the core.

12. The invention as set forth in claim 11 and comprising a bull snap coupled to the tethering device remote from the horse halter means.

13. The invention as set forth in claim 12 and in which the ratio of the breaking length of the sheath to the nominal length of the core is greater than the ratio of 2 to 1.

14. The invention as set forth in claim 11 and in which the sheath comprises double braided dacron.

15. The invention as set forth in claim 11 and in which the cord has a length of about 4 feet, the core has a break point of about 12 feet and the sheath has a break point greater than 12 feet.

16. A horse tethering arrangement comprising:
    halter means for attaching a cord to the horse, the halter means disposed on the horse and having means for receiving a clasp;
    rope means for coupling the halter means to a hitching post, the rope means comprising
       an outer sheath; and
       a resilient inner core, the inner resilient core having a breaking length and the outer sheath defining a breaking length greater than the breaking length of the inner core so that excess movement of a horse when attached to the halter means and the rope means affixed to the hitching post results in the inner core breaking before the sheath, whereby the breaking and snapping of the inner core occurs within the sheath avoiding injury to the horse from snapping of the core.

17. The invention as set forth in claim 16 and in which the core comprises rubber round stock and in which the sheath comprises braided woven material fitted over the core.

18. The invention as set forth in claim 17 and in which the cord has a length of about 4 feet, the core has a break point of about 12 feet and the sheath has a break point greater than 12 feet.

* * * * *